Patented Feb. 9, 1932

1,844,919

UNITED STATES PATENT OFFICE

JAMES B. GRENAGLE, OF BALTIMORE, MARYLAND, ASSIGNOR OF ONE-HALF TO WILLIAM W. VARNEY, OF BALTIMORE, MARYLAND

NEW PRODUCT FOR ELECTRICAL PURPOSES AND PROCESS FOR MAKING THE SAME

No Drawing.    Application filed January 2, 1930.   Serial No. 418,167.

To understand more fully the objects of my invention, I would call attention to my co-pending application for United States patent for process of rectification, rectifier and method of making the same, Ser. No. 410,592, filed Nov. 29, 1929, in which cores, plates and conductors are specifically set forth embracing the product the object of this invention.

The object of my invention is the method of producing a new product for use in cores, and plates in the magnetic field and with currents of an electric character in rectifiers.

A further object of my invention is the production of cores for rectifiers of electric currents.

A further object of my invention is the production of a material for condenser plates in an electric condenser as involved in the rectification of electrical energy.

A further object of my invention is the production of a material for use in the conducting or non-conducting of electric current as involved in the rectification of an alternating current.

A further object of my invention is the process of making material involved in this application and my co-pending application above mentioned wherein the product herein mentioned is used.

A further object of my invention is an improved method and process of making and the product obtained for a plate for use in the core of the rectifier mentioned in the above co-pending application, and is to take the place of the "a" plate mentioned therein as an improvement thereof.

A further object of my invention is an improved product having a beryllium content, and method of making the same for use in my rectifier.

A further object of my invention is an improved product having a beryllium content combined with a barium content, and the method of making the same as involved in my improved rectifier above mentioned.

A further object of my invention is the production of a sintered element as a core for a magnetic field.

In this specification and claims, when I use the term, "sintered", I mean an aggregation formed in a solid, not by a fusion of all the elements involved.

I have discovered that a sintered plate or element in a core of an apparatus for rectifying an electric current, gives better results than a cast metallic element, and especially as adapted for the "a" element or plate in the core in the magnetic field of the co-pending application, No. 410,592, above referred to.

The following is a full description of the process of manufacture and the product produced involved in this application.

While I have given specific proportions and detailed steps, a wide variation may take place as to proportions and steps in detail production.

The mineral beryl is mixed with sodium pyro-sulphate and coke in the proportion of 300 parts acid to 50 parts coke and 100 parts ore.

This mixture is charged into an electric furnace and the whole thoroughly melted together. The following reactions are assumed to take place:

(1) $FeBeO_3 + Na_2SO_4 + 2C =$
$\quad\quad FeS + Na_2BeO_3 + 2CO_3$.

(2) $2FeBeO_3 + 2Na_2SO_4 + 6C =$
$\quad\quad 2Na_2FeS + BeO_3 + CO + 5CO_2$.

Equation (1) represents the predominant reaction, and Equation (2) a secondary reaction which occurs to a very much less extent.

The melt is then cast into deep moulds, such as sand moulds, but, preferably, into iron moulds, in order that it may cool slowly, thus effecting a separation into two layers by gravity. The upper portion, consisting of ferro-sodium sulphate, is called the "matte", while the lower portion, which contains most of the beryllium as sodium berylnate, is called the beryllium concentrate. All of the "matte" after cooling is broken away, leaving the beryllium concentrate comparatively free from iron. This material is ground and the residue treated with dilute sulphuric acid (not over 20%) at boiling temperature. These operations remove most of the impurities and bring about complete hydrolysis of the sodium berylnate to beryllic acid (or basic beryllium sulphate) without causing any appreciable loss of beryllium.

The undissolved residue is separated from the mother liquid by a suitable method, such as, precipitation, or filtration, washed and dried (but not calcined).

This concentrate dissolves readily in strong sulphuric acid, 2 to 3 parts of 95% acid is added to the concentrate in an iron vessel and digested at a temperature of 100° to 150° C. The mass is then transferred to a lead lined tank and diluted with water, the volume of which should be about 3 times that of the acid previously used. The solution is filtered. To the filtrate washed barium-sulphate is added. The mixture is then heated and thoroughly agitated; whereupon, the beryllium sulphate is decomposed and the resulting compounds (basic berylic sulphate and beryllic acid) adhere to, coalesce with and impregnate the dispersed aggregations of barium sulphate. The composite mass is separated by filtration, washed, dried and calcined. This calcined beryllium is subjected to high pressure (without binding material) so as to reduce crystal structure, for a period of time. It is then removed to an Abbe ball mill and finely screened and stirred with water and poured into forms or moulds; if for use as cores in the apparatus shown in my previous application referred to, it is formed into plates, then dried and calcined. These plates show no cracks on drying and calcining, but are tight and are not easily fractured.

The calcining temperature should be about 1200° C., leaving the plates in a sintered metallic state.

I make my barium sulphate as follows: By heating together a mixture of barytes and coke, say about 2 of coke to 1 of barytes, extracting the barium sulphate with water and adding sodium sulphate thereto sufficient to precipitate the barium sulphate, but not in excess.

I have discovered that magnetic fields consisting of a sintered composition prevent in a great measure what is known as Foucault currents; in other words, to prevent overheating locally; and I have discovered that this is so especially when the same has a beryllium content.

Having thus described my invention, what I claim and desire to secure by Letters Patent is:

1. A material for magnetic fields for use in electrical apparatus such as rectifiers comprising a sintered composition having a beryllium content.

2. A material for magnetic fields for use in electrical apparatus such as rectifiers comprising a sintered composition having a beryllium content in combination with barium content.

3. A core for a magnetic field comprising a material in a sintered formation formed to a desired shape.

4. An element for a rectifier core comprising a sintered mass of a beryllium content.

5. An element of a rectifier core comprising a sintered mass of a berryllium and a barium content.

6. A core for a rectifier comprising a sintered mass of a metallic element content.

7. An element for a rectifier core comprising a mass having a beryllium and a barium content.

JAMES B. GRENAGLE.